S. H. BISHOP.
Carriage-Pole.
No. 17,191. Patented May 5, 1857.
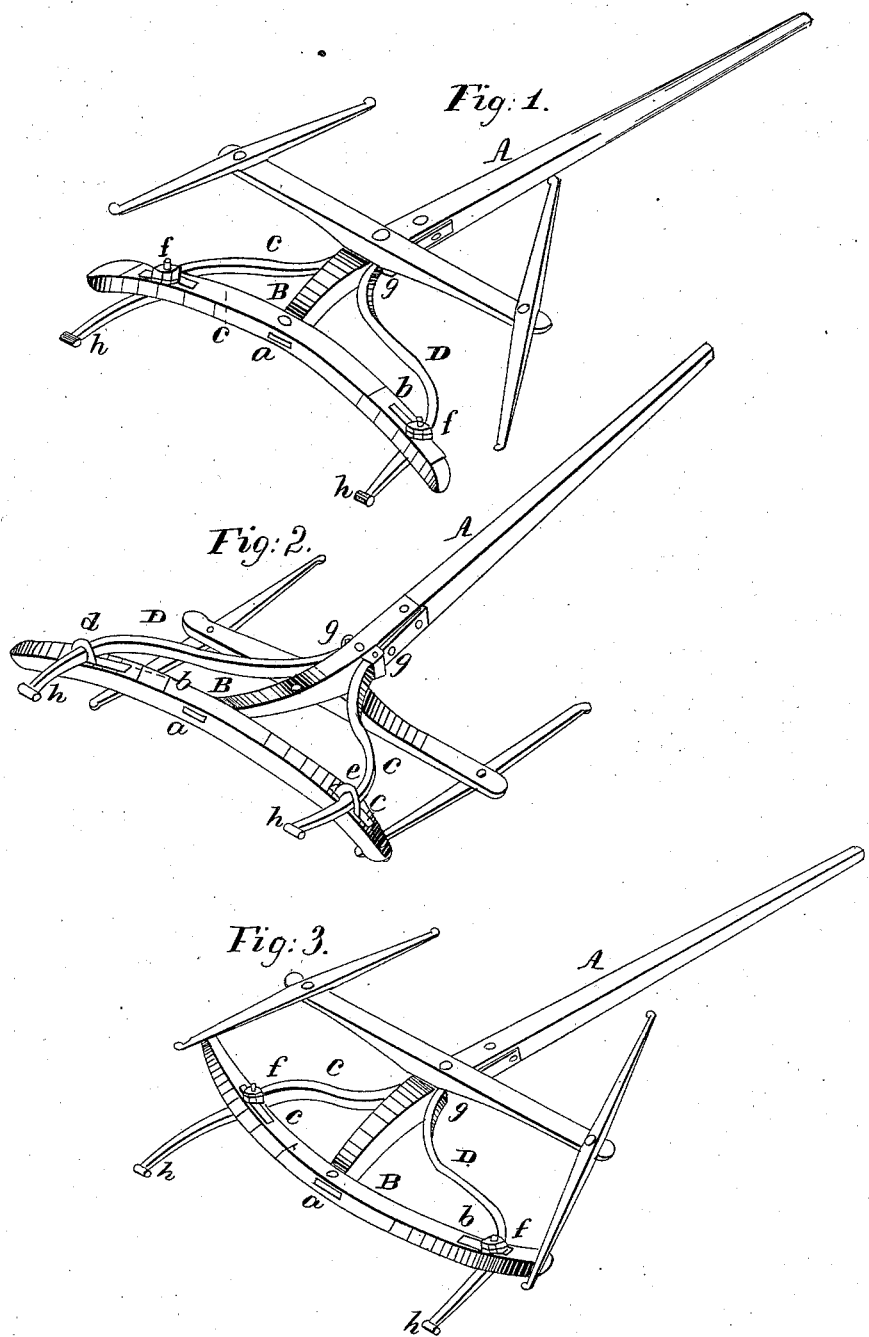

UNITED STATES PATENT OFFICE.

SHERLOCK H. BISHOP, OF ORANGE, CONNECTICUT.

ADJUSTABLE POLE FOR CARRIAGES.

Specification of Letters Patent No. 17,191, dated May 5, 1857.

*To all whom it may concern:*

Be it known that I, SHERLOCK H. BISHOP, of the town of Orange, in the county of New Haven and State of Connecticut, have invented a new and useful Improvement in Adjustable Poles for Carriages; and I do hereby declare that the following is a full, clear, and exact description of the construction, character, and operation of the same, reference being had to the accompanying drawings, which make a part of this specification, in which—

Figure 1, is a perspective view of the pole and its appendages. Fig. 2, is a perspective view of the same, turned bottom upward. Fig. 3, is a perspective view of the same as Fig. 1, with the arch piece reversed.

My improvement consists in constructing the braces of the pole with joints, and the arch piece with slots, and securing the braces to the arch piece by double adjustable attachments.

I make the pole in the ordinary shape, as seen at A, Figs. 1, 2 and 3, and attach it to the center of the arch piece, as seen at $a$.

I make the arch piece with its convex side toward the pole, as shown at B, Figs. 1 and 2, with a slot in each end, as seen at $b$ and $c$, to receive the eye bolts $d$, and $e$, which receive the braces C, and D, as shown in Fig. 2. These eye bolts are held in their places by nuts, $f$, and $f$, so as to hold the braces firmly in the desired position.

I make the braces of iron, or any other suitable material, substantially, in the shape shown in the drawings, with joints, as seen at $g$, Figs. 1, 2 and 3, so as to render them readily susceptible of adjustment. And I secure the immovable parts of them firmly to the pole, A, by bolts. And I make eyes in the ends of the movable parts, in the usual way, as seen at $h$, and $h$, by which they are to be connected with the irons on the axle. I pass these braces through the eyes in the screw bolts, as shown at $d$ and $e$, Fig. 2, and put the bolts through the slots in the arch pieces, as shown at $f$, and $f$, Fig. 1, when the pole is ready to be attached to the carriage.

To attach the pole, I turn back the nuts, $f$ and $f$, so that the bolts may move freely in the slots $b$, and $c$, and the braces in the eyes $d$ and $e$, and secure the ends, $h$, and $h$, of the braces to the axle, and then turn on the nuts, $f$, and $f$, so as to hold the braces perfectly secure in their proper places, to brace the pole.

If deemed best, in any case, the arch piece, B, may be reversed, that is, turn the concave side toward the pole, as shown in Fig. 3, when the slots, $b$, and $c$, will be in the same plane in which the eye bolts, $d$, and $e$, will move in adjusting the braces, in which case the bolts may be immovably attached to the braces; but, for symmetry at least, I prefer the manner just described.

The advantages of my improvement consist in that, by its use, one pole will be sufficient for several carriages, (which are commonly used with shafts for one horse,) and therefore peculiarly convenient for livery-stable keepers, and for public carriages, as it affords greater convenience, at less expense.

What I claim as my invention, and desire to secure by Letters Patent, is—

The method herein described of adjusting the braces, by means of the joints, slots, and eye bolts, when the whole is constructed, arranged, and made to operate, substantially as herein set forth.

SHERLOCK H. BISHOP.

Witnesses:
  S. THOMPSON,
  R. FITZGERALD.